US012243343B2

(12) United States Patent
Yamazaki

(10) Patent No.: US 12,243,343 B2
(45) Date of Patent: Mar. 4, 2025

(54) APPARATUS, METHOD, AND COMPUTER PROGRAM FOR DETECTING HAND REGION

(71) Applicant: TOYOTA JIDOSHA KABUSHIKI KAISHA, Toyota (JP)

(72) Inventor: Masayuki Yamazaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 17/984,731

(22) Filed: Nov. 10, 2022

(65) Prior Publication Data

US 2023/0177861 A1 Jun. 8, 2023

(30) Foreign Application Priority Data

Dec. 7, 2021 (JP) ................................ 2021-198850

(51) Int. Cl.
*G06V 40/10* (2022.01)
*G06V 10/22* (2022.01)
*G06V 10/764* (2022.01)

(52) U.S. Cl.
CPC ............ *G06V 40/107* (2022.01); *G06V 10/22* (2022.01); *G06V 10/764* (2022.01)

(58) Field of Classification Search
CPC ..... G06V 40/107; G06V 10/22; G06V 10/764
See application file for complete search history.

(56) References Cited

U.S. PATENT DOCUMENTS

| 9,041,543 | B2* | 5/2015 | Inada ................... | B60K 28/066 340/576 |
| 10,503,987 | B2* | 12/2019 | Banno ................... | B60W 40/10 |
| 11,170,578 | B1* | 11/2021 | Casaburo ................ | G06T 7/277 |
| 2006/0284837 | A1* | 12/2006 | Stenger ................ | G06V 40/107 345/156 |
| 2011/0216941 | A1 | 9/2011 | Saijo | |
| 2013/0207805 | A1 | 8/2013 | Inada | |
| 2014/0147035 | A1* | 5/2014 | Ding ................... | G06V 40/161 382/164 |

(Continued)

FOREIGN PATENT DOCUMENTS

| JP | 2007 052609 A | 3/2007 |
| JP | 2013 164663 A | 8/2013 |
| WO | 2011 001761 A1 | 1/2011 |

*Primary Examiner* — Utpal D Shah
(74) *Attorney, Agent, or Firm* — Sughrue Mion, PLLC

(57) ABSTRACT

An apparatus for detecting a hand region includes a processor configured to: calculate a confidence score indicating a probability that a hand is represented for each pixel of a target image, determine, for each of predetermined points on an edge of the image, a probability that a hand extends outside the image at the predetermined point, set a lower hand region detection threshold at a predetermined point having a higher probability that a hand extends outside the image, set a hand region detection threshold of each pixel of the image at a value calculated by averaging hand region detection thresholds of the predetermined points respectively weighted by the distances from the pixel to the predetermined points, and detect a set of pixels in which the confidence score of each pixel is higher than the hand region detection threshold set for the pixel, as a hand region representing a hand.

5 Claims, 6 Drawing Sheets

(56) References Cited

U.S. PATENT DOCUMENTS

| | | | |
|---|---|---|---|
| 2015/0154449 A1* | 6/2015 | Ito | G06T 7/90 |
| | | | 382/103 |
| 2020/0005467 A1* | 1/2020 | Yamada | G06V 10/50 |
| 2020/0387698 A1* | 12/2020 | Yi | G06N 3/084 |
| 2022/0076448 A1* | 3/2022 | Liu | G06T 7/75 |
| 2022/0405502 A1* | 12/2022 | Wang | G06T 7/70 |
| 2024/0004075 A1* | 1/2024 | Durigneux | G01S 17/89 |

* cited by examiner

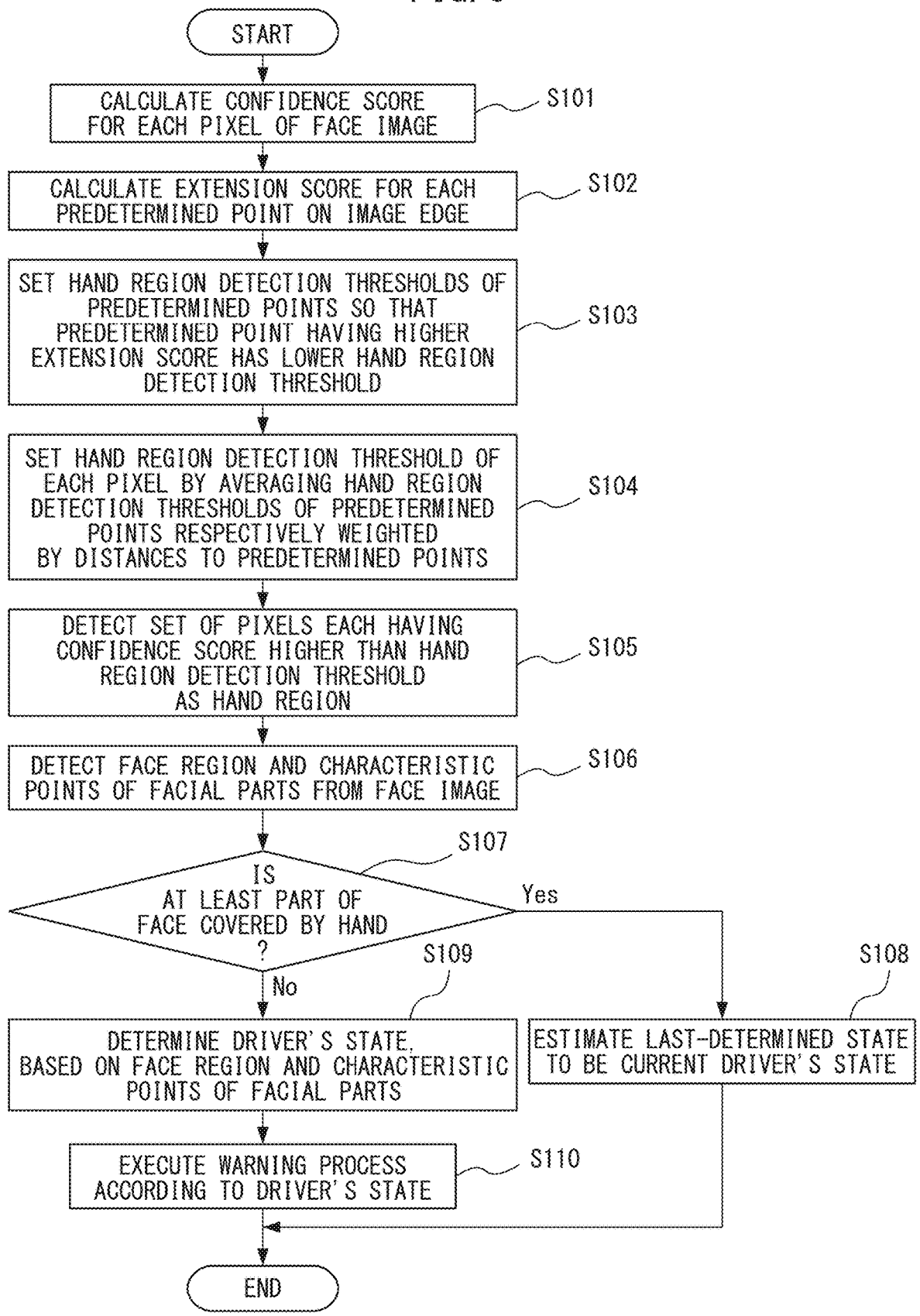

APPARATUS, METHOD, AND COMPUTER PROGRAM FOR DETECTING HAND REGION

FIELD

The present invention relates to an apparatus, a method, and a computer program for detecting a hand region representing a hand in an image.

BACKGROUND

A technique to monitor a target person by detecting his/her face from time-series images obtained by continuously capturing the face with a camera, such as a driver monitoring camera or a Web camera, has been researched. However, not only a target person's face but also his/her hand may be inadvertently represented in the area captured by the camera, depending on the position of the hand in some cases. Thus, detecting a hand represented in an image generated by a camera has been proposed (see Japanese Unexamined Patent Publication JP2013-164663A).

A looking-aside determination apparatus disclosed in JP2013-164663A successively captures a driver's face to obtain images, and then detects the driver's face orientation, using the obtained images, and determines whether the driver is looking aside, based on the result of detection. When the driver's hand is represented in an obtained image, the apparatus further detects the shape of the driver's hand, using the image.

SUMMARY

When a target person's hand is represented together with his/her face, the hand, which is closer to the camera than the face, may be represented large in the image. Thus the hand may extend outside an edge of the image, and the whole hand may not be represented in the image, in some cases. In such a case, it may be difficult to detect a hand region correctly.

It is an object of the present invention to provide an apparatus that can accurately detect a hand region representing a hand in an image.

According to an embodiment, an apparatus for detecting a hand region is provided. The apparatus includes a processor configured to: calculate a confidence score indicating a probability that a hand is represented for each pixel of an image by inputting the image into a classifier that has been trained to calculate the confidence score for each pixel, determine, for each of predetermined points on an edge of the image, a probability that a hand extends outside the image at the predetermined point, set hand region detection thresholds of the predetermined points so that a predetermined point having a higher probability that a hand extends outside the image has a lower hand region detection threshold, set a hand region detection threshold of each pixel of the image at a value calculated by averaging the hand region detection thresholds of the predetermined points respectively weighted by the distances from the pixel to the predetermined points, and detect a set of pixels of the image in which the confidence score of each pixel is higher than the hand region detection threshold set for the pixel, as a hand region representing a hand.

The processor of the apparatus preferably calculates the probability that a hand extends outside the image for each of the predetermined points by inputting the image into an extension classifier that has been trained to calculate the probability for each of the predetermined points.

Alternatively, the processor is preferably further configured to predict the position of the hand region in the image from the hand region in each of time-series past images obtained in a preceding predetermined period, and the processor sets the probability that a hand extends outside the image at one of the predetermined points inside the predicted hand region higher than the probability at one of the predetermined points outside the predicted hand region.

According to another embodiment, a method for detecting a hand region is provided. The method includes: calculating a confidence score indicating a probability that a hand is represented for each pixel of an image by inputting the image into a classifier that has been trained to calculate the confidence score for each pixel; determining, for each of predetermined points on an edge of the image, a probability that a hand extends outside the image at the predetermined point; setting hand region detection thresholds of the predetermined points so that a predetermined point having a higher probability that a hand extends outside the image has a lower hand region detection threshold; setting a hand region detection threshold of each pixel of the image at a value calculated by averaging the hand region detection thresholds of the predetermined points respectively weighted by the distances from the pixel to the predetermined points; and detecting a set of pixels of the image in which the confidence score of each pixel is higher than the hand region detection threshold set for the pixel, as a hand region representing a hand.

According to still another embodiment, a non-transitory recording medium that stores a computer program for detecting a hand region is provided. The computer program includes instructions causing a computer to execute a process including: calculating a confidence score indicating a probability that a hand is represented for each pixel of an image by inputting the image into a classifier that has been trained to calculate the confidence score for each pixel; determining, for each of predetermined points on an edge of the image, a probability that a hand extends outside the image at the predetermined point; setting hand region detection thresholds of the predetermined points so that a predetermined point having a higher probability that a hand extends outside the image has a lower hand region detection threshold; setting a hand region detection threshold of each pixel of the image at a value calculated by averaging the hand region detection thresholds of the predetermined points respectively weighted by the distances from the pixel to the predetermined points; and detecting a set of pixels of the image in which the confidence score of each pixel is higher than the hand region detection threshold set for the pixel, as a hand region representing a hand.

The apparatus according to the present disclosure has an advantageous effect of being able to accurately detect a hand region representing a hand in an image.

BRIEF DESCRIPTION OF DRAWINGS

FIG. 6 is an operation flowchart of the driver monitoring process including the hand region detection process.

DESCRIPTION OF EMBODIMENTS

An apparatus for detecting a hand region as well as a method and a computer program therefor executed by the apparatus will now be described with reference to the attached drawings. Regarding an image representing a target person's hand, the apparatus calculates, for each pixel, a confidence score indicating a probability that a hand is represented in the pixel, and detects a set of pixels each having a confidence score higher than a hand region detection threshold, as a hand region representing a hand. However, when a part of a hand extends outside an image, features specific to the hand, such as the contour of the hand, are lost in pixels near the image edge where the hand extends outside. This makes it difficult to detect a hand region accurately. Thus, for each of predetermined points set on an image edge, the apparatus calculates a probability that a hand extends outside the image at the predetermined point, and sets a lower hand region detection threshold at a predetermined point having a higher probability. Additionally, the apparatus sets a hand region detection threshold of each pixel of the image at a value calculated by averaging the hand region detection thresholds of the predetermined points respectively weighted by the distances from the pixel to the predetermined points.

The following describes an example in which the apparatus for detecting a hand region is applied to a driver monitor that monitors a vehicle driver, based on time-series images obtained by continuously capturing the driver's face. The driver monitor detects a face region representing the driver's face from an image generated by a driver monitoring camera provided to capture the driver's head, and determines the driver's state, based on the result of detection. However, when a hand region is detected from an image by the above-described hand region detection process and covering at least part of the driver's face, the driver monitor does not determine the driver's state.

Figure 1:
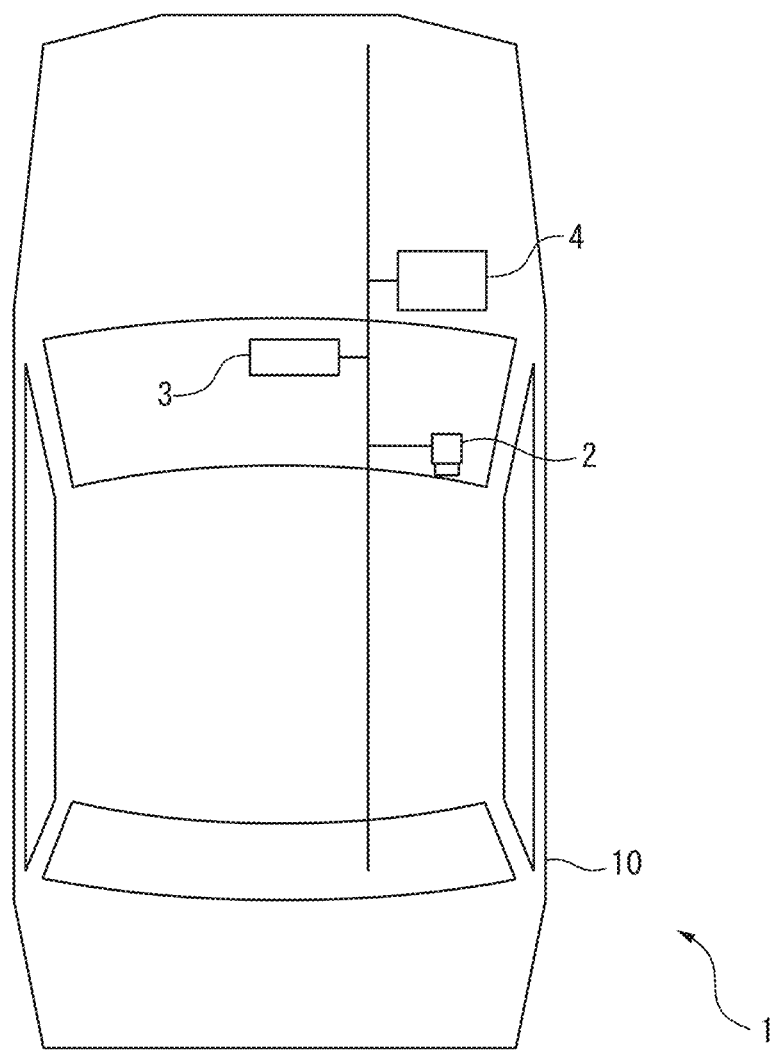
FIG. 1 schematically illustrates the configuration of a vehicle control system equipped with an apparatus for detecting a hand region.
Figure 2:
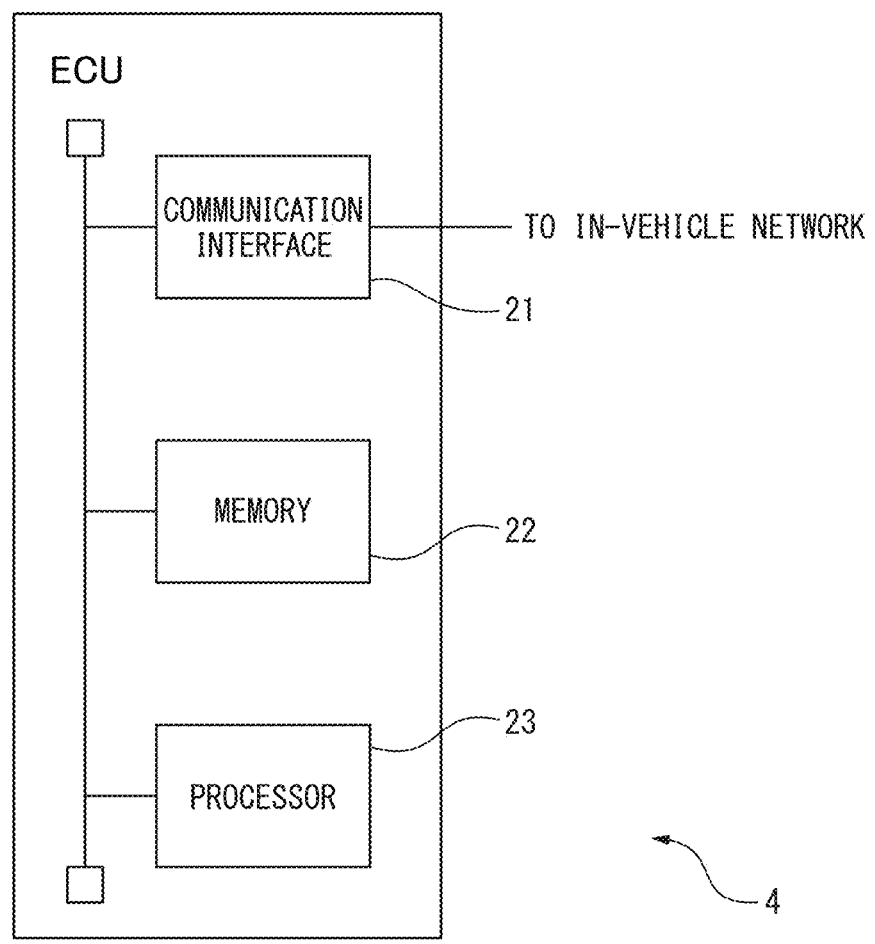
FIG. 2 illustrates the hardware configuration of an electronic control unit, which is an embodiment of the apparatus for detecting a hand region.

FIG. 1 schematically illustrates the configuration of a vehicle control system equipped with the apparatus for detecting a hand region. FIG. 2 illustrates the hardware configuration of an electronic control unit, which is an embodiment of the apparatus for detecting a hand region. In the present embodiment, the vehicle control system 1, which is mounted on a vehicle 10 and controls the vehicle 10, includes a driver monitoring camera 2, a user interface 3, and an electronic control unit (ECU) 4, which is an example of the apparatus for detecting a hand region. The driver monitoring camera 2 and the user interface 3 are communicably connected to the ECU 4 via an in-vehicle network conforming to a standard such as a controller area network. The vehicle control system 1 may further include a GPS receiver (not illustrated) for measuring the position of the vehicle 10. The vehicle control system 1 may further include at least a camera (not illustrated) for capturing the surroundings of the vehicle 10 or a distance sensor (not illustrated), such as LiDAR or radar, which measures the distances from the vehicle 10 to objects around the vehicle 10. The vehicle control system 1 may further include a wireless communication terminal (not illustrated) for wireless communication with another device. The vehicle control system 1 may further include a navigation device (not illustrated) for searching for a travel route of the vehicle 10.

The driver monitoring camera 2, which is an example of a camera or an in-vehicle image capturing unit, includes a two-dimensional detector constructed from an array of optoelectronic transducers, such as CCD or C-MOS, having sensitivity to visible or infrared light and a focusing optical system that forms an image of a target region on the two-dimensional detector. The driver monitoring camera 2 may further include a light source, such as an infrared LED, for illuminating the driver. The driver monitoring camera 2 is mounted, for example, on or near an instrument panel and oriented to the driver so that the head of the driver sitting on the driver's seat of the vehicle 10 may be included in the area to be captured, i.e., so that the camera can capture the driver's head. The driver monitoring camera 2 captures the driver's head every predetermined capturing period (e.g., 1/30 to 1/10 seconds) and generates images representing the driver's face (hereafter referred to as "face images" for convenience of description). The face images obtained by the driver monitoring camera 2 may be color or grayscale images. Whenever a face image is generated, the driver monitoring camera 2 outputs the face image to the ECU 4 via the in-vehicle network.

The user interface 3, which is an example of a notification unit, includes, for example, a display, such as a liquid crystal display or an organic electroluminescent display. The user interface 3 is mounted in the interior of the vehicle 10, e.g., on the instrument panel, and oriented to the driver. The user interface 3 displays various types of information received from the ECU 4 via the in-vehicle network to notify the driver of the information. The user interface 3 may further include a speaker mounted in the interior of the vehicle. In this case, the user interface 3 outputs various types of information received from the ECU 4 via the in-vehicle network, in the form of a voice signal, to notify the driver of the information. The user interface 3 may further include a light source provided in or near the instrument panel, or a vibrator provided in the steering wheel or the driver's seat. In this case, the user interface 3 turns on or blinks the light source or vibrates the vibrator according to information received from the ECU 4 via the in-vehicle network to notify the driver of the information.

The ECU 4 detects the driver's face orientation, based on a face image, and determines the driver's state, based on the face orientation. When the driver's state is unsuitable for driving, e.g., when the driver is looking away, the ECU 4 warns the driver with the user interface 3.

As illustrated in FIG. 2, the ECU 4 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 4 to the in-vehicle network. Whenever a face image is received from the driver monitoring camera 2, the communication interface 21 passes the face image to the processor 23. When information to be displayed on the user interface 3 is received from the processor 23, the communication interface 21 outputs the information to the user interface 3.

The memory 22, which is an example of a storage unit, includes, for example, volatile and nonvolatile semiconductor memories. The memory 22 stores various algorithms and various types of data used in a driver monitoring process including the hand region detection process executed by the processor 23 of the ECU 4. For example, the memory 22 stores a set of parameters for defining a classifier used for calculating a confidence score indicating a probability that a hand is represented, and a set of parameters for defining a classifier used for calculating an extension score indicating a probability that a hand extends outside a face image. Additionally, the memory 22 stores a reference table representing the relationship between extension scores and hand region detection thresholds. Additionally, the memory 22 temporarily stores face images received from the driver monitoring camera 2 and various types of data generated during the driver monitoring process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the driver monitoring process including the hand region detection process at predetermined intervals on the latest face image received by the ECU 4 from the driver monitoring camera 2.

Figure 3:
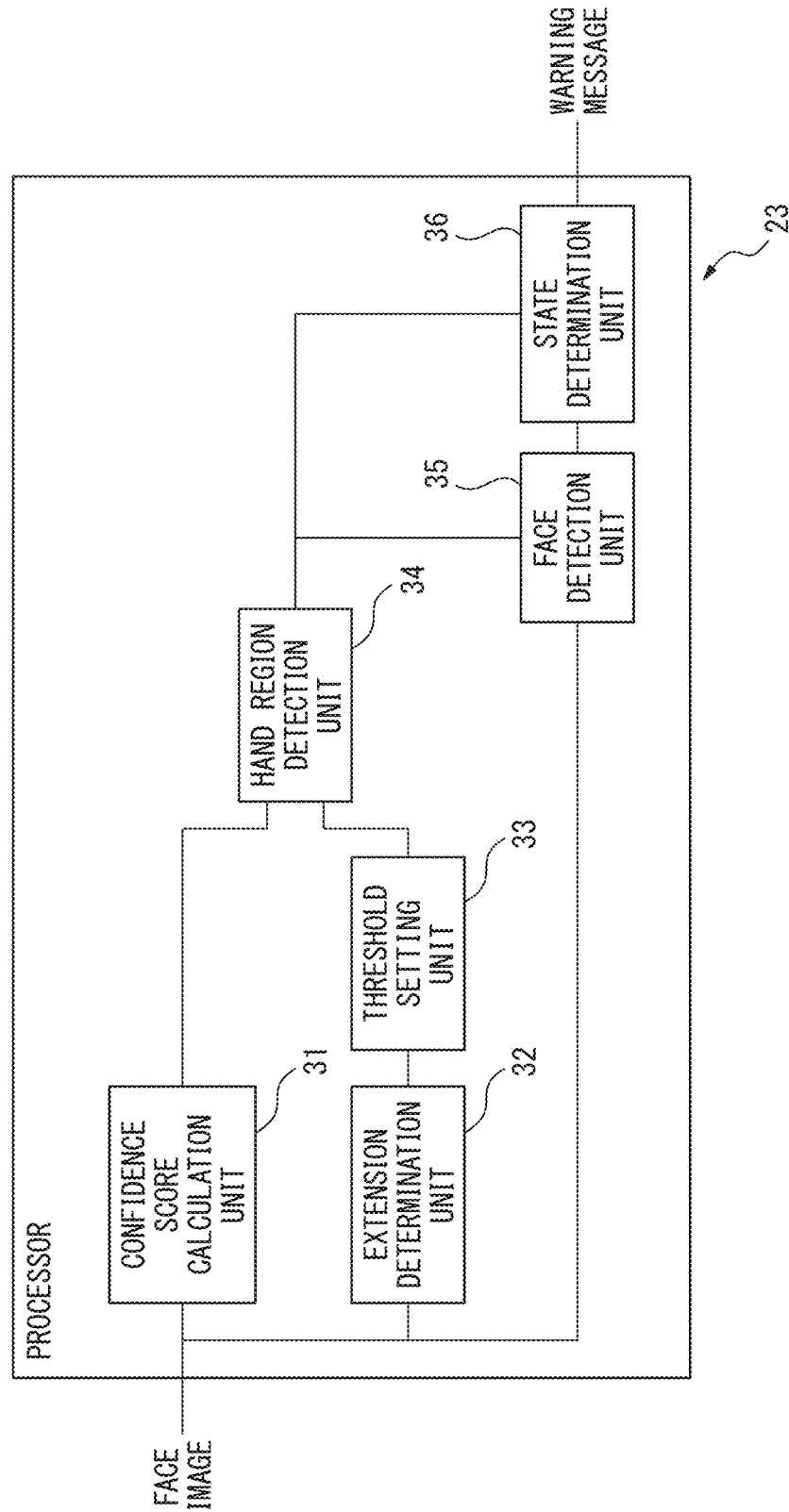
FIG. 3 is a functional block diagram of a processor of the electronic control unit, related to a driver monitoring process including a hand region detection process.

FIG. 3 is a functional block diagram of the processor 23, related to the driver monitoring process including the hand region detection process. The processor 23 includes a confidence score calculation unit 31, an extension determination unit 32, a threshold setting unit 33, a hand region detection unit 34, a face detection unit 35, and a state determination unit 36. These units included in the processor 23 are functional modules, for example, implemented by a computer program executed by the processor 23, or may be dedicated operating circuits provided in the processor 23. Of these units included in the processor 23, the confidence score calculation unit 31, the extension determination unit 32, the threshold setting unit 33, and the hand region detection unit 34 relate to the hand region detection process.

The confidence score calculation unit 31 calculates, for each pixel of a face image, a confidence score indicating a probability that a hand is represented on the pixel. In the present embodiment, the confidence score calculation unit 31 calculates the confidence score for each pixel by inputting the face image into a classifier that has been trained to calculate the confidence score for each pixel of a face image.

As such a classifier, the confidence score calculation unit 31 can use, for example, a deep neural network (DNN) for semantic segmentation, such as a fully convolutional network, U-Net, or SegNet. Alternatively, the confidence score calculation unit 31 may use a classifier conforming to another segmentation technique, such as a random forest, as such a classifier. The classifier is trained in advance with a large number of training images representing hands by a training technique depending on the classifier, e.g., by backpropagation.

The confidence score calculation unit 31 notifies the hand region detection unit 34 of the confidence scores of the respective pixels of the face image.

For each of predetermined points on an edge of the face image, the extension determination unit 32 determines a probability that a hand extends outside the face image at the predetermined point. In the present embodiment, the extension determination unit 32 calculates an extension score indicating a probability that a hand extends outside the face image for each predetermined point by inputting the face image into an extension classifier that has been trained to calculate the extension score for each predetermined point.

The predetermined points are set, for example, at the midpoints of the top, bottom, left, and right sides of the face image. Alternatively, the predetermined points may be set at the positions at which the top, bottom, left, and right sides of the face image are divided into three to five equal parts. Alternatively, the predetermined points may be set at the four corners of the face image.

Figure 4:
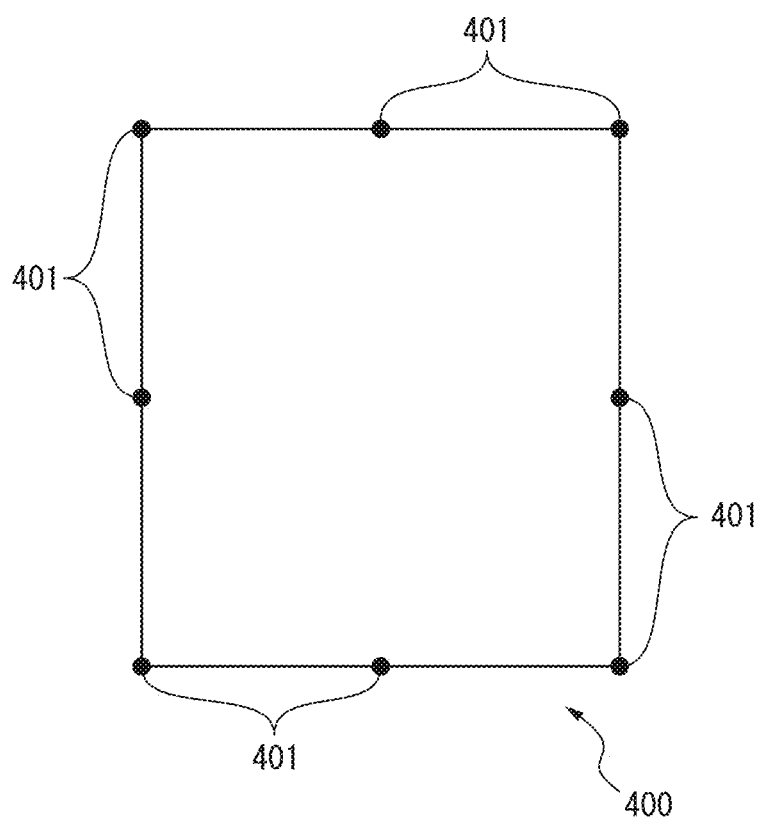
FIG. 4 illustrates an example of predetermined points set on a face image.

FIG. 4 illustrates an example of the predetermined points set on a face image. In the present embodiment, predetermined points 401 are set at every corner and the midpoint of every side of a face image 400, as illustrated in FIG. 4. In other words, eight predetermined points 401 are set for the face image 400 in the present embodiment.

The extension classifier, which calculates the extension score for each predetermined point, is configured to output the extension score of each predetermined point as a value between 0 and 1. Alternatively, the extension classifier may be configured to output a value indicating that a hand does not extend outside (e.g., 0) or a value indicating that a hand extends outside (e.g., 1) as the extension score of each predetermined point.

As the extension classifier, the extension determination unit 32 can use, for example, a DNN having architecture of a convolutional neural network (CNN) type. In this case, an output layer for calculating the extension score of each predetermined point is provided downstream of one or more convolution layers. The output layer executes a sigmoid operation on a feature map calculated by each convolution layer for each predetermined point to calculate the extension score for each predetermined point. Alternatively, as the extension classifier, the extension determination unit 32 may use a classifier conforming to another machine learning technique, such as support vector regression. The extension classifier is trained in advance with a large number of training images representing hands part of which extends outside by a training technique depending on the extension classifier, e.g., by backpropagation.

The extension determination unit 32 notifies the threshold setting unit 33 of the extension scores calculated for the respective predetermined points.

The threshold setting unit 33 sets a hand region detection threshold for each pixel of the face image. In the present embodiment, the threshold setting unit 33 first sets hand region detection thresholds of the predetermined points of the face image so that a predetermined point having a higher extension score has a lower hand region detection threshold. Thus the hand region detection threshold is set lower as the driver's hand is more likely to extend outside, which enables accurate detection of a hand region even when the driver's hand extends outside the face image.

The threshold setting unit 33 sets a hand region detection threshold for each predetermined point, depending on the extension score at the predetermined point in accordance with a relational expression representing the relationship between extension scores and hand region detection thresholds. Alternatively, the threshold setting unit 33 may refer to a reference table representing the relationship between extension scores and hand region detection thresholds to set a hand region detection threshold for each predetermined point, depending on the extension score at the predetermined point.

Additionally, for each pixel of the face image other than the predetermined points, the threshold setting unit 33 sets a hand region detection threshold of the pixel by averaging the hand region detection thresholds of the predetermined points respectively weighted by the distances from the pixel to the predetermined points. To this end, the threshold setting unit 33 sets a greater weight on the hand region detection threshold at a predetermined point closer to a pixel of interest. The threshold setting unit 33 may set the weighting factor of a predetermined point at a predetermined distance or more at 0. Thus, a lower hand region detection threshold is set for a pixel closer to the position at which a hand extends outside the face image.

Figure 5A:
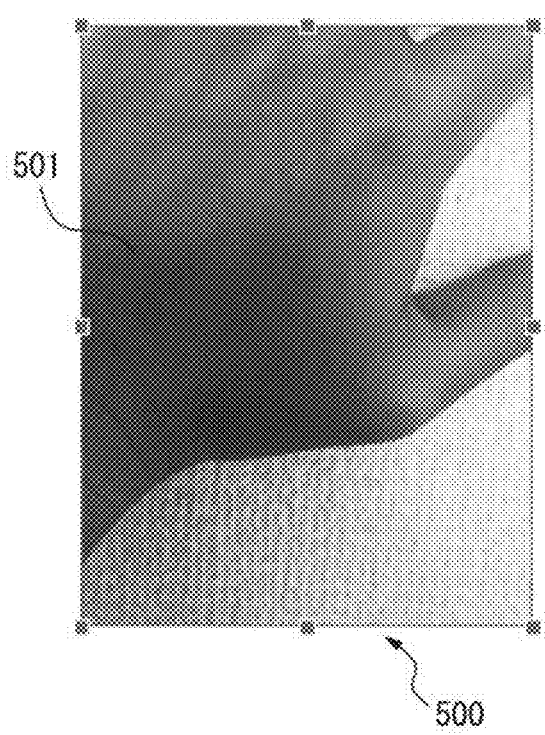
FIG. 5A illustrates an example of an image representing a hand.
Figure 5B:
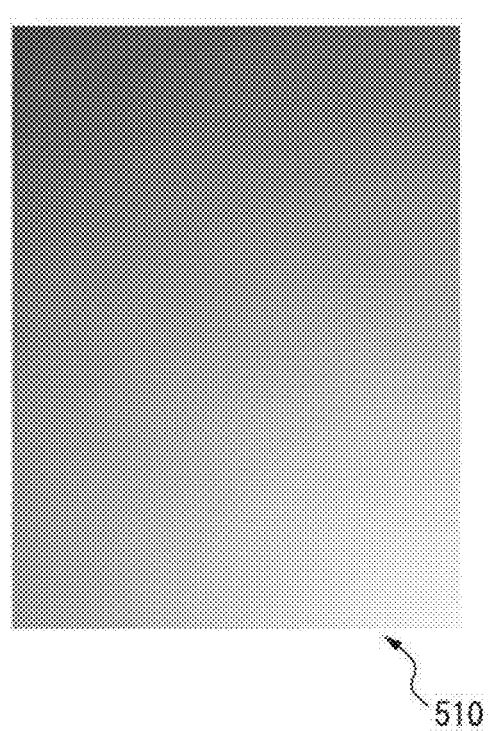
FIG. 5B illustrates an example of hand region detection thresholds set for the pixels of the image illustrated in FIG. 5A.

FIG. 5A illustrates an example of an image representing a hand, and FIG. 5B illustrates an example of hand region detection thresholds set for the pixels of the image illustrated in FIG. 5A. A darker pixel of a threshold image 510 illustrated in FIG. 5B indicates that a lower hand region detection threshold is set for a pixel at the corresponding position in the image 500 illustrated in FIG. 5A. In the example illustrated in FIG. 5A, a hand 501 represented in the image 500 extends outside the image 500 through most of the left and upper edges and part of the right edge of the image 500. Thus, as illustrated in the threshold image 510 of FIG. 5B, a lower hand region detection threshold is set for a pixel closer to the upper or left edge of the image 500. In contrast, a higher hand region detection threshold is set for a pixel closer to the lower right corner of the image 500.

The threshold setting unit 33 notifies the hand region detection unit 34 of the hand region detection thresholds of the respective pixels of the face image.

For each pixel of the face image, the hand region detection unit 34, which is an example of the detection unit, compares the confidence score calculated for the pixel with the hand region detection threshold set for the pixel. The hand region detection unit 34 then selects pixels each having a confidence score higher than the hand region detection threshold, and detects a set of the selected pixels as a hand region representing the driver's hand.

The hand region detection unit 34 notifies the face detection unit 35 and the state determination unit 36 of information indicating the detected hand region (e.g., a binary image that is the same size as the face image and in which pixels inside the hand region and pixels outside the hand region have different values).

The face detection unit 35 detects a face region representing the driver's face from the face image. For example, the face detection unit 35 detects the face region, for example, by inputting the face image into a classifier that has been trained to detect a driver's face from an image. As such a classifier, the face detection unit 35 can use, for example, a DNN having architecture of a CNN type, such as Single Shot MultiBox Detector (SSD) or Faster R-CNN. Alternatively, the face detection unit 35 may use an AdaBoost classifier as such a classifier. In this case, the face detection unit 35 sets a window in the face image and calculates a feature useful for determining the presence or absence of a face, such as a Haar-like feature, from the window. The face detection unit 35 then inputs the calculated feature into the classifier to determine whether the driver's face is represented in the window. While variously changing the position, size, aspect ratio, and orientation of the window on the face image, the face detection unit 35 executes the above-described processing to determine the window in which the driver's face is detected as a face region. The face detection unit 35 may set the window outside the hand region. The classifier is trained in advance in accordance with a predetermined training technique depending on a machine learning technique applied to the classifier with training data including images that represent faces and images that do not represent faces. The face detection unit 35 may detect a face region from the face image in accordance with another technique to detect a face region from an image.

Additionally, the face detection unit 35 detects characteristic points of each facial part from the detected face region.

The face detection unit 35 can detect characteristic points of each facial part by applying a detector designed to detect the characteristic points to the face region. As such a detector, the face detection unit 35 can use, for example, a detector that uses information on the whole face, such as an active shape model (ASM) or an active appearance model (AAM). Alternatively, the face detection unit 35 may use a DNN that has been trained to detect characteristic points of each facial part as the detector.

The face detection unit 35 notifies the state determination unit 36 of information indicating the face region detected from the face image (e.g., the coordinates of the upper left end, the horizontal width, and the vertical height of the face region in the face image) and the positions of the characteristic points of each facial part.

The state determination unit 36 determines the driver's state, based on the face region and the characteristic points of the facial parts. However, when the driver's hand is covering at least part of the driver's face, the state determination unit 36 does not determine the driver's state. For example, when the hand region makes up not less than a predetermined proportion (e.g., 30 to 40 percent) of the face image, the state determination unit 36 determines that at least part of the driver's face is covered by the driver's hand, and thus does not determine the driver's state. When no characteristic point of a facial part is detected and the face region is in contact with the hand region, the state determination unit 36 may also determine that at least part of the driver's face is covered by the driver's hand. Alternatively, when the ratio of the area of the hand region to that of the face region is not less than a predetermined ratio, the state determination unit 36 may also determine that at least part of the driver's face is covered by the driver's hand. Thus, in these cases also, the state determination unit 36 need not determine the driver's state. The state determination unit 36 determines the last-determined driver's state as the current driver's state.

In the present embodiment, the state determination unit 36 compares the orientation of the driver's face represented in the face region with a reference direction of the driver's face to determine whether the driver's state is suitable for driving the vehicle 10. The reference direction of the face is prestored in the memory 22.

The state determination unit 36 fits the detected characteristic points of the face into a three-dimensional face model representing the three-dimensional shape of a face. The state determination unit 36 then detects the orientation of the face of the three-dimensional face model best fitted by the characteristic points as the driver's face orientation. Alternatively, the state determination unit 36 may detect the driver's face orientation, based on the face image, in accordance with another technique to determine the orientation of a face represented in an image. The driver's face orientation is expressed, for example, as a combination of pitch, yaw, and roll angles with respect to the direction to the front of the driver monitoring camera 2.

The state determination unit 36 calculates the absolute value of the difference between the orientation of the driver's face represented in the face region and the reference direction of the driver's face, and compares the absolute value of the difference with a predetermined face orientation tolerance. When the absolute value of the difference is outside the face orientation tolerance, the state determination unit 36 determines that the driver is looking away, i.e., the driver's state is unsuitable for driving the vehicle 10.

The driver may look other than ahead of the vehicle 10 to check the situation around the vehicle 10. However, even in such a case, the driver will not continue looking other than ahead of the vehicle 10 as long as the driver is concentrating on driving the vehicle 10. Thus, according to a modified example, the state determination unit 36 may determine that the driver's state is unsuitable for driving the vehicle 10, in the case that the absolute value of the difference between the orientation and the reference direction of the driver's face has been outside the face orientation tolerance for a predetermined time (e.g., several seconds) or longer.

When it is determined that the driver's state is unsuitable for driving the vehicle 10, the state determination unit 36 generates warning information including a warning message to warn the driver to look ahead of the vehicle 10. The state determination unit 36 then outputs the generated warning information to the user interface 3 via the communication interface 21, and thereby causes the user interface 3 to display the warning message or a warning icon. Alternatively, the state determination unit 36 causes the speaker included in the user interface 3 to output a voice to warn the driver to look ahead of the vehicle 10. Alternatively, the state determination unit 36 turns on or blinks the light source included in the user interface 3, or vibrates the vibrator included in the user interface 3.

FIG. 6 is an operation flowchart of the driver monitoring process executed by the processor 23 and including the hand region detection process. The processor 23 executes the driver monitoring process in accordance with this operation flowchart at predetermined intervals. In the illustrated operation flowchart, the process of steps S101 to S105 corresponds to the hand region detection process.

The confidence score calculation unit 31 of the processor 23 calculates, for each pixel of the latest face image received by the ECU 4 from the driver monitoring camera 2, a confidence score indicating a probability that a hand is represented on the pixel (step S101). For each of predetermined points on an edge of the face image, the extension determination unit 32 of the processor 23 calculates an extension score indicating a probability that a hand extends outside the face image at the predetermined point (step S102).

The threshold setting unit 33 of the processor 23 sets hand region detection thresholds of the predetermined points of the face image so that a predetermined point having a higher extension score has a lower hand region detection threshold (step S103). Additionally, for each pixel of the face image other than the predetermined points, the threshold setting unit 33 sets a hand region detection threshold of the pixel by averaging the hand region detection thresholds of the predetermined points respectively weighted by the distances from the pixel to the predetermined points (step S104).

The hand region detection unit 34 of the processor 23 selects pixels of the face image each having a confidence score higher than the hand region detection threshold, and detects a set of the selected pixels as a hand region representing the driver's hand (step S105).

The face detection unit 35 of the processor 23 detects a face region representing the driver's face and characteristic points of facial parts from the face image (step S106).

The state determination unit 36 of the processor 23 determines whether at least part of the driver's face is covered by the driver's hand, based on the hand region (step S107). When at least part of the driver's face is covered by the driver's hand (Yes in step S107), the state determination unit 36 determines the last-determined driver's state as the current driver's state (step S108).

When the driver's face is not covered by the driver's hand (No in step S107), the state determination unit 36 detects the driver's face orientation, based on the face region and the characteristic points of the facial parts, and determines the driver's state (step S109). The state determination unit 36 then executes, for example, a warning process according to the result of determination (step S110). After step S110, the processor 23 terminates the driver monitoring process.

As has been described above, the apparatus for detecting a hand region determines an extension score indicating how likely a hand extends outside for each predetermined point set on an edge of an image representing a hand, and sets a lower hand region detection threshold at a predetermined point having a higher extension score. The apparatus then sets a hand region detection threshold of each pixel by averaging the hand region detection thresholds of the predetermined points respectively weighted by the distances from the predetermined points. The apparatus then detects a set of pixels each having a confidence score indicating a probability that a hand is represented, which is calculated for each pixel, higher than the hand region detection threshold as a hand region. In this way, the apparatus sets a lower hand region detection threshold near an edge of the image where it is highly likely that the driver's hand extends outside. Thus the apparatus can accurately detect pixels representing a hand, even near an image edge where the hand extends outside and hand-specific features represented in the image are lost. As a result, the apparatus can detect a hand region from the image accurately.

When time-series images representing a hand are obtained by successively taking pictures as in the case of the driver monitoring camera, it is expected that the position at which a hand extends outside is not changed much between successive images. Thus, according to a modified example, the execution cycle of the processing by the extension determination unit 32 and the threshold setting unit 33 may be made longer than that of the hand region detection process. In other words, the extension determination unit 32 and the threshold setting unit 33 may execute processing only on one of a predetermined number of successively obtained face images. The hand region detection unit 34 may then use the hand region detection thresholds of the respective pixels set by the last processing executed by the extension determination unit 32 and the threshold setting unit 33 for detecting a hand region. According to this modified example, the apparatus for detecting a hand region can reduce the frequency of execution of the processing by the extension determination unit 32 and the threshold setting unit 33, and thus reduce the amount of computation required for the hand region detection process in a certain period.

According to another modified example, when the execution cycle of the extension determination process using the extension classifier is longer than that of the hand region detection process, the extension determination unit 32 may determine whether a hand extends outside by executing a prediction process on face images on which the extension determination process using the classifier is not executed. For example, the extension determination unit 32 calculates optical flow from hand regions in time-series past face images obtained in a preceding predetermined period or applies a prediction filter, such as a Kalman filter, to the hand regions to predict the position of a hand region in the latest face image. The extension determination unit 32 then assumes that a hand extends outside the face image at some of the predetermined points inside the predicted hand region, and that a hand does not extend outside the face image at the other predetermined points outside the predicted hand region. The extension determination unit 32 sets an extension score at a predetermined point where a hand is assumed to extend outside the face image higher than an extension score at a predetermined point where a hand is assumed not to extend outside.

The apparatus for detecting a hand region according to the present embodiment may be used not only for a driver monitor but also for other purposes. For example, the apparatus according to the present embodiment is suitably used for various purposes that requires detecting a target person's face or hand from an image obtained by a camera for capturing the person's face, such as a Web camera or another surveillance camera. Alternatively, the apparatus may be used for detecting a gesture of a hand, based on a detected hand region. In this case, the apparatus detects a gesture in accordance with one of various techniques to detect a gesture from a hand region.

The computer program for achieving the functions of the processor 23 of the ECU 4 according to the embodiment or modified examples may be provided in a form recorded on a computer-readable and portable medium, such as a semiconductor memory, a magnetic medium, or an optical medium.

As described above, those skilled in the art may make various modifications according to embodiments within the scope of the present invention.

What is claimed is:

1. An apparatus for detecting a hand region, comprising a processor configured to:
    calculate a confidence score indicating a probability that a hand is represented for each pixel of an image by inputting the image into a classifier that has been trained to calculate the confidence score for each pixel,
    determine, for each of predetermined points on an edge of the image, a probability that a hand extends outside the image at the predetermined point,
    set hand region detection thresholds of the predetermined points so that a predetermined point having a higher probability that a hand extends outside the image has a lower hand region detection threshold,
    set a hand region detection threshold of each pixel of the image at a value calculated by averaging the hand region detection thresholds of the predetermined points respectively weighted by the distances from the pixel to the predetermined points, and
    detect a set of pixels of the image in which the confidence score of each pixel is higher than the hand region detection threshold set for the pixel, as a hand region representing a hand.

2. The apparatus according to claim 1, wherein the processor calculates the probability for each of the predetermined points by inputting the image into an extension classifier that has been trained to calculate the probability for each of the predetermined points.

3. The apparatus according to claim 1, wherein the processor is further configured to predict the position of the hand region in the image from the hand region in each of time-series past images obtained in a preceding predetermined period, and wherein the processor sets the probability at one of the predetermined points inside the predicted hand region higher than the probability at one of the predetermined points outside the predicted hand region.

4. A method for detecting a hand region, comprising:
    calculating a confidence score indicating a probability that a hand is represented for each pixel of an image by inputting the image into a classifier that has been trained to calculate the confidence score for each pixel;
    determining, for each of predetermined points on an edge of the image, a probability that a hand extends outside the image at the predetermined point;
    setting hand region detection thresholds of the predetermined points so that a predetermined point having a higher probability that a hand extends outside the image has a lower hand region detection threshold;
    setting a hand region detection threshold of each pixel of the image at a value calculated by averaging the hand region detection thresholds of the predetermined points respectively weighted by the distances from the pixel to the predetermined points; and
    detecting a set of pixels of the image in which the confidence score of each pixel is higher than the hand region detection threshold set for the pixel, as a hand region representing a hand.

5. A non-transitory recording medium that stores a computer program for detecting a hand region, the computer program causing a computer to execute a process comprising:
    calculating a confidence score indicating a probability that a hand is represented for each pixel of an image by inputting the image into a classifier that has been trained to calculate the confidence score for each pixel;
    determining, for each of predetermined points on an edge of the image, a probability that a hand extends outside the image at the predetermined point;
    setting hand region detection thresholds of the predetermined points so that a predetermined point having a higher probability that a hand extends outside the image has a lower hand region detection threshold;
    setting a hand region detection threshold of each pixel of the image at a value calculated by averaging the hand region detection thresholds of the predetermined points respectively weighted by the distances from the pixel to the predetermined points; and
    detecting a set of pixels of the image in which the confidence score of each pixel is higher than the hand region detection threshold set for the pixel, as a hand region representing a hand.

* * * * *